United States Patent [19]

Ginter et al.

[11] Patent Number: 4,680,043
[45] Date of Patent: Jul. 14, 1987

[54] METHOD FOR DENSIFICATION OF POWDERY SILICA AND ARTICLE FORMED THEREBY

[75] Inventors: Herbert Ginter, Mobile, Ala.; Reinhard Klingel, Wasserlos; Reinhard Manner, Maintal, both of Fed. Rep. of Germany

[73] Assignee: Degussa Aktiengesellschaft, Frankfurt, Fed. Rep. of Germany

[21] Appl. No.: 757,811

[22] Filed: Jul. 22, 1985

[30] Foreign Application Priority Data

Aug. 7, 1984 [DE] Fed. Rep. of Germany ....... 3429051

[51] Int. Cl.⁴ .......................................... C03B 37/027
[52] U.S. Cl. .......................................... 65/2; 65/18.1; 264/114; 428/402
[58] Field of Search ................. 264/114, 125, 109; 65/1, 2, 18.1; 428/402

[56] References Cited

U.S. PATENT DOCUMENTS

| 2,304,723 | 12/1942 | Wolff et al. | 264/114 X |
| 2,960,723 | 11/1960 | Stark | 65/1 X |
| 3,888,662 | 6/1975 | Boeckeler | 264/114 X |
| 4,271,114 | 6/1981 | Ohno | 264/114 |

FOREIGN PATENT DOCUMENTS 40237   1/1965   Japan ................................... 65/18.1

Primary Examiner—Robert Lindsay
Attorney, Agent, or Firm—Beveridge, DeGrandi & Weilacher

[57] ABSTRACT

A powdery substance, such as for example pyrogenically prepared silicon dioxide, is subjected to predensification through the utilization of centrifugal force in a centrifuge. Subsequently, the centrifuge receptacles are closed with a free flying piston. Through utilization of the centrifugal force, there is achieved through the use of the free flying piston an additional pressure which is exerted on the predetermined powdery substance.

4 Claims, 2 Drawing Figures

METHOD FOR DENSIFICATION OF POWDERY SILICA AND ARTICLE FORMED THEREBY

The present invention relates to a method for the densification of finely divided substances, especially pyrogenically produced silicon dioxide.

In the preparation of glass fibers for the production of lighting circuit cables and use in the field of fiber optics, it is desired to employ pressed preformed bodies formed of pyrogenically prepared silicon dioxide powder.

In order to attain the previously set high purity standards for the production of glasses suitable for use in fiber optics, these pressed preforms must exhibit the high purity of the pyrogenically prepared silicon dioxide and a high density. The densification should be uniform whereby the pressed preforms exhibit a sufficiently high porosity.

The known preparative procedures have the disadvantage that either a binder material must be added thereto as a result of which the high purity of the pyrogenically prepared silicon dioxide is lost, or the desired densification is not attained.

It is accordingly the object of the invention to provide a method for the densification of powdery substances which is characterized in that the powdery substance is predensified through utilization of centrifugal force in a centrifuge wherein the centrifuge receptacles are unsealed, and subsequently further densification is carried out wherein the centrifuge receptacles are sealed by means of a free flying piston or other device capable of applying pressure, which because of the centrifugal force establishes additional pressure on the material to be densified. In a particular embodiment of the invention, there may be used as the powdery forming substance a pyrogenically prepared silicon dioxide.

Figure 1:
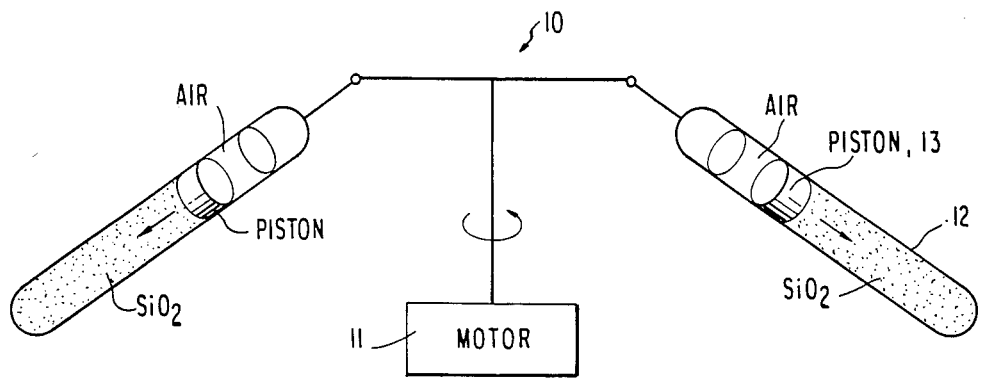
FIG. 1 shows the apparatus for carying out the invention.

The method of the present invention will be further understood by reference to the drawing which shows, in schematic form, a centrifuge device (10) comprising a motor (11), and two centrifuge chambers (12). The finely divided substance, as for example silica, is placed in the chamber 12 and rotated for a short period of time; e.g. 1 minute up to 10 minutes. Then a free flying piston (13) is inserted into each of the chambers and the process is repeated for a second time.

The method of the present invention enables the obtaining of a high densification of the powdery substance without the utilization of additional binder materials. The powdery substance such as, for example, pyrogenically prepared silicon dioxide thereby retains its initial high purity. The pressed preforms which are obtained thereby, exhibit a definite form because they are shaped in accordance with the centrifugal receptacle that is utilized in the process which can be tailored to the specific purpose for which the product is intended. The configuration of the outer form of the pressed preforms can be molded in accordance with the resulting shape and configuration of the inner form of the centrifuge receptacle. For example, the pressed preform can be made in a cylindrical form with a relationship of length to diameter of 5. The exact size and configuration of the pressed preform can vary widely and may be block shaped, cylindrical or any other shape.

The method of the present invention provides a very careful densification. Through the homogeneous application of the pressure, a uniform densification of the pressed preforms takes place.

The solid pressed preforms exhibit a sufficient porous structure whereby they can exhibit a liter weight of at least 300 g (g/l). The exact density of the final product may be varied widely depending on the value desired.

As a result of the method of the present invention, the air in the powdery substance can be removed in an unhindered fashion so that the pressed preforms contain no pockets of air.

The stress cracks and flaws which are observed in pressed preforms prepared in accordance with known procedures are not observed in connection with the pressed preforms which are obtained in accordance with the present invention.

In carrying out the method of the present invention, the use of a filter medium is not necessary. The mechanical difficulties which are connected therewith are thereby not observed.

The pressed preforms which are obtained by following the methods of the present invention which are formed, for example, from pyrogenically prepared silicon dioxide can be used with advantage in the preparation of glass fibers for the production of a variety of material as for example light circuit cables and for fiber optics purposes. A variety of techniques and methods are known for preparing glass fibers and any suitable method may be used in accordance herewith, as for instance by drawing into a fiber, as will be apparent to the person skilled in this art.

It is to be understood that the device shown in the drawing may vary in size and shape. Thus, the structure of chamber 12 can be cylindrical or block form. The device may also have a plurality of chambers; i.e. more than two. The piston (13) is formed so as to fit into the chamber to permit easy removal and placement thereof by the attendant. It may be formed from any hard, heavy substance such as steel which does not contaminate the finely divided powder.

The pressure that is developed by the piston in the chamber ranges from 2 to 30 bar, preferably within the range of 5 to 15 bar. The number of revolutions per minute of the centrifuge can vary depending on the size and type of machine that is used. Because of the laws of physics, one may be a lower number of revolutions with a large diameter. The optimal time for the centrifuging is about 1 to 10 minutes, preferably 4 to 8 minutes.

It should be noted that process of the invention may be carried out in more than two steps. It is important that the first step accomplish a predensification method, the use of the piston. This may be carried out by filling the chamber with a powdery substance in several steps with open centrifugation being conducted after each filling. Then when as much compaction of the powder can be obtained as is possible with the open, unsealed centrifuge chamber, the piston is installed to bring about the ultimate compaction and centrifugation. Thus, the final compaction with the free flying piston may be carried out in the second, third, fourth, fifth, etc. step.

The finely divided powdery material may be preshaped into any desired form before it is placed into the centrifuge device. Thus, for example, an amount of silicon may be molded into a rod or cylinder by placing an adequate amount into a split mold made of Teflon (polytetrafluoroethylene) or any other inert material.

The present invention is illustrated by the examples which follows:

EXAMPLE

A pyrogenically prepared silicon dioxide with a specific surface of 50 g/m² (sold by Degussa AG under the name AEROSIL OX 50) is charged to the beaker of a beaker centrifuge. The measurements of the 4 glass beakers in the beaker centrifuge were about 58 mm in the inner diameter and about 100 mm in length with a volume of 100 cm³. The maximum achieveable centrifugal speed with this centrifuge was 4000.

The density of the starting material of the silicon dioxide was 20 g/l. This silicon dioxide was then subject to densification using the centrifuge. As a result thereof, using an average centrifugal speed of about 3200 there was obtained a product having an average density of about 200 g/l. The duration of the centrifugation was 60 seconds.

The product so obtained through this predensification was subsequently subjected to further densification using a free flying piston of steel (p=7.86 kg/dm³), the diameter of the piston was 37 mm and its height was 20 mm. The pistons were thrust into each of the beaker glasses until the pistons contacted the predensified product. Then the centrifuging action is turned on whereby the pistons tend to travel in an outwardly direction thereby subjecting the pyrogenically prepared silicon dioxide to further densification.

There can be calculated with an average radius of about 90 mm and a speed of the centrifuge of 4100 revolutions per minute a centrifuging factor for the densifying pistons of about 1700 and thereby achieving a densification pressure of about 26.7 bar. The centrifuging time ranges up to 5 minutes in order to obtain a homogeneous preformed product.

The silicon dioxide after the densification has an average final density of 500 to 530 g/l. It does not burst apart after removal of the pistons but instead remains as a homogeneous pressed body. Through the relatively wide space of about 0.5 mm between the densifying cylinders and the glass beaker, there is only a small amount of powdery substance.

Figure 2:
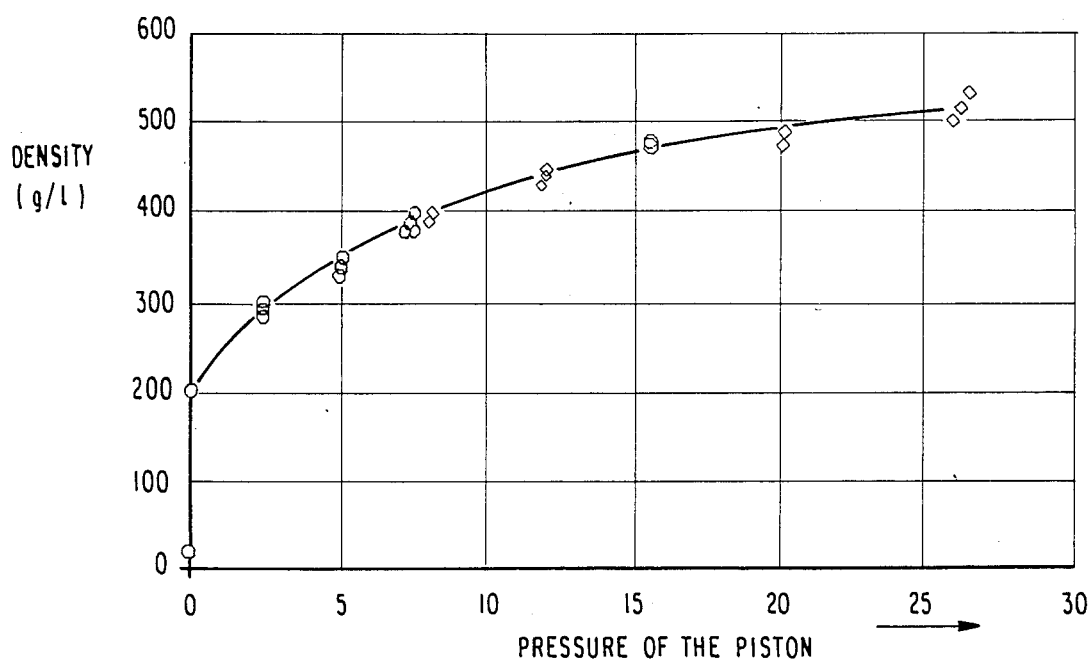
FIG. 2 is a graph showing the relationship between the obtainable end density and the pressure of the density piston.

The relationship between the obtainable end density and the pressure of the density piston is shown in FIG. 2.

Further variations and modifications of the present invention will become apparent from the foregoing and are intended to be encompassed by the claims appended hereto.

We claim:

1. Method for the densification of a powdery substance comprising in a first step introducing a powdery substance consisting of pyrogenically prepared silicon dioxide into a centrifuge having an open receptacle and subjecting said powdery substance to centrifugal action in said open receptacle to bring about a predensification of said substance, and subsequently subjecting the powdery substance to additional centrifugal force in the presence of a free flying piston whereby as a result of the additional centrifugal force, additional pressure is created by the piston on the powdery substance to bring about a further densification of the powdery substance.

2. The method in accordance with claim 1, wherein the powdery substance is subjected to a predensification to increase the density from 20 g/l to an average of 200 g/l and is subsequently subjected to additional centrifugal action in said second step to further increase the density to about 500 to 530 g/l.

3. A method of preparing glass fibers for light circuit cable comprising drawing into a glass fiber a densified pyrogenicaly prepared silcon dioxide prepared in accordance with claim 1.

4. The produce produced by the method of claim 1.

* * * * *